United States Patent
Gluth et al.

(10) Patent No.: US 11,806,669 B2
(45) Date of Patent: Nov. 7, 2023

(54) VARIABLE AND SELF-REGULATING PERMEATE RECYCLING IN ORGANOPHILIC NANOFILTRATION

(71) Applicant: Evonik Operations GmbH, Essen (DE)

(72) Inventors: Frederik Gluth, Mülheim an der Ruhr (DE); Marc Schäpertöns, Recklinghausen (DE); Thomas Quell, Antwerp (BE); Frank Geilen, Haltern am See (DE); Stefan Drees, Dülmen (DE); Fabian Höckelmann, Marl (DE); Robert Franke, Marl (DE)

(73) Assignee: Evonik Operations GmbH, Essen (DE)

( * ) Notice: Subject to any disclaimer, the term of this patent is extended or adjusted under 35 U.S.C. 154(b) by 113 days.

(21) Appl. No.: 17/549,709

(22) Filed: Dec. 13, 2021

(65) Prior Publication Data

US 2022/0193611 A1    Jun. 23, 2022

(30) Foreign Application Priority Data

Dec. 22, 2020   (EP) .................................. 20216295

(51) Int. Cl.
  *B01D 61/12*   (2006.01)
  *B01D 61/02*   (2006.01)

(52) U.S. Cl.
  CPC ........... *B01D 61/12* (2013.01); *B01D 61/027* (2013.01); *B01D 2311/14* (2013.01);
  (Continued)

(58) Field of Classification Search
  CPC .. B01D 61/12; B01D 61/027; B01D 2311/14; B01D 2311/16; B01D 2311/25;
  (Continued)

(56) References Cited

U.S. PATENT DOCUMENTS

| 8,999,038 B2 | 4/2015 | Ungerank et al. |
| 10,017,443 B2 | 7/2018 | Lueken et al. |

(Continued)

FOREIGN PATENT DOCUMENTS

| CA | 3127918 A1 | 8/2020 |
| DE | 10 2004 007 548 A1 | 9/2005 |

(Continued)

OTHER PUBLICATIONS

European Search Report dated Jun. 22, 2021 in EP 20216295.4 (12 pages).

(Continued)

*Primary Examiner* — Pranav N Patel
(74) *Attorney, Agent, or Firm* — Grüneberg and Myers PLLC

(57) ABSTRACT

The invention provides an improvement in terms of control and process technology for a method of continuous removal of a component from a liquid mixture using a membrane unit comprising at least one membrane stage. The improvement is that a portion of the overall permeate stream is recycled to the feed vessel and/or beyond the feed vessel but upstream of the conveying device, and the remainder of the overall permeate stream is removed, with the recycled permeate having a higher concentration of the component to be separated off than the removed permeate. The presently disclosed method can especially be used for separation of a homogeneously dissolved catalyst from a liquid reaction mixture.

20 Claims, 2 Drawing Sheets

(52) U.S. Cl.
CPC ...... *B01D 2311/16* (2013.01); *B01D 2311/25* (2013.01); *B01D 2311/263* (2013.01); *B01D 2311/2696* (2013.01); *B01D 2315/10* (2013.01); *B01D 2317/022* (2013.01)

(58) Field of Classification Search
CPC ...... B01D 2311/263; B01D 2311/2696; B01D 2315/10; B01D 2317/022; B01D 2313/50; B01D 61/08; B01D 61/10; B01J 8/009; B01J 8/005; B01J 31/4061; B01J 31/4046
See application file for complete search history.

(56) References Cited

U.S. PATENT DOCUMENTS

| | | |
|---|---|---|
| 10,087,349 B2 | 10/2018 | Brenner et al. |
| 10,155,200 B2 | 12/2018 | Geilen et al. |
| 10,501,392 B2 | 12/2019 | Fridag et al. |
| 10,633,302 B2 | 4/2020 | Nadolny et al. |
| 10,647,650 B2 | 5/2020 | Hecht et al. |
| 10,654,784 B2 | 5/2020 | Hasselberg et al. |
| 10,850,261 B2 | 12/2020 | Nadolny et al. |
| 10,882,027 B2 | 1/2021 | Nadolny et al. |
| 11,008,275 B2 | 5/2021 | Kucmierczyk et al. |
| 2006/0237361 A1 | 10/2006 | Dudziak et al. |
| 2013/0098242 A1* | 4/2013 | Ungerank ............ B01D 53/226 96/10 |
| 2016/0082393 A1 | 3/2016 | Priske et al. |
| 2019/0283004 A1 | 9/2019 | Nadolny et al. |
| 2020/0391194 A1 | 12/2020 | Kucmierczyk et al. |
| 2020/0392057 A1 | 12/2020 | Kucmierczyk et al. |
| 2020/0392064 A1 | 12/2020 | Kucmierczyk et al. |
| 2021/0179534 A1 | 6/2021 | Schulz et al. |
| 2022/0134274 A1* | 5/2022 | Pedersen ................ C07C 7/144 585/818 |

FOREIGN PATENT DOCUMENTS

| | | |
|---|---|---|
| DE | 20 2019 001 414 U1 | 4/2019 |
| EP | 0 781 166 B1 | 8/2000 |
| EP | 1 603 663 B1 | 5/2010 |
| EP | 2 588 217 A1 | 5/2013 |
| EP | 3 059 005 A1 | 8/2016 |
| FR | 3 074 490 A1 | 6/2019 |
| WO | 2012/000727 A1 | 1/2012 |
| WO | 2014/131623 A1 | 9/2014 |
| WO | 2014/183952 A1 | 11/2014 |

OTHER PUBLICATIONS

Quell et al., U.S. Appl. No. 17/549,256, filed Dec. 13, 2021.
Brächer et al., U.S. Appl. No. 17/371,477, filed Jul. 9, 2021.

* cited by examiner

VARIABLE AND SELF-REGULATING PERMEATE RECYCLING IN ORGANOPHILIC NANOFILTRATION

CROSS REFERENCE TO RELATED APPLICATIONS

This application is a 35 U.S.C. § 119 patent application which claims the benefit of European Application No. 20216295.4 filed Dec. 22, 2020, which is incorporated herein by reference in its entirety.

FIELD

The present invention relates to an improvement in terms of control and process technology for a method of continuous removal of a component from a liquid mixture using a membrane unit comprising at least one membrane stage. The improvement is that a portion of the overall permeate stream is recycled to the feed vessel and/or beyond the feed vessel but upstream of the conveying device, and the remainder of the overall permeate stream is removed, with the recycled permeate having a higher concentration of the component to be separated off than the removed permeate. The presently disclosed method can especially be used for separation of a homogeneously dissolved catalyst from a liquid reaction mixture.

BACKGROUND

Membrane separation methods, for example for the separation of homogeneously dissolved catalysts from the reaction mixture, are known in principle in the prior art. Reference is made here by way of example to WO 2014/131623 A1.

For membrane separation methods of this kind, improvements in control technology have already been described. International application WO 2014/183952 A1 discloses, for example, a membrane separation method for separation of a homogeneously dissolved catalyst from a reaction mixture, in which two parameters, the retentate volume flow rate of the membrane separation unit and the retention of the membrane separation unit, are controlled to remain constant in order to compensate for fluctuating operating conditions, especially fluctuations in the volume flow rate of the reaction mixture coming from the reaction zone.

In order to keep the aforementioned controlled variables constant, WO 2014/183952 A1 proposes a flow resistor for adjusting the retentate volume flow rate, or keeping it constant, and closed-loop control of the temperature and/or of the pressure in the overflow circuit for adjusting the retention, or keeping it constant.

A problem with the method proposed therein is that it is not productive for all methods to keep the retention of the membrane separation unit constant; instead—taking account of the plant throughput and the membrane area already installed in the membrane separation unit—what is required is optimization, frequently maximization, of the retention of the membrane separation unit during the method. Closed-loop control by means of a flow resistor as described in WO 2014/183952 A1 may possibly have the effect that the membrane area already installed is operated not at the optimal transmembrane pressure but below it. The method described therein can additionally have the effect that, for a given total throughput of the plant and the resulting permeate stream removed therefrom (portion of the permeate stream conducted out of the membrane stage or the membrane separation unit on the permeate side), the total permeate stream and the resulting recycled permeate stream on the basis of a simple mass balance taking account of the permeate stream removed (portion of the total permeate stream which is recycled into the membrane separation unit) is smaller than possible and/or would be desirable.

A further disadvantage of the method described in WO 2014/183952 A1 is that it envisages both a vessel for the permeate and a pump in order to obtain a closed-loop control system which is constant on the permeate side. The provision of a pump that pumps permeate from the permeate vessel into the overflow circuit or the feed vessel, however, is associated with an elevated plant inventory and costs, for example for procurement or for operation, maintenance and repair, which can additionally also result in a plant shutdown and hence production shutdown.

In addition, the installation of a vessel generally has the effect that the portion of the membrane separation stage on the permeate side is not filled hydraulically, which can possibly lead to elevated safety risks, especially when toxic fluids are used. Moreover, a vessel on the permeate side in addition to the feed vessel gives rise to the possibility that the closed-loop control of the two vessel states may lead to opposite fluctuations.

SUMMARY

The problem addressed by the present invention was therefore that of providing a less expensive method of continuously separating a component from a mixture, preferably for continuous separation of a homogeneous catalyst from a reaction mixture. A further problem addressed by the present invention was that of providing self-regulating permeate recycling in the method of continuous separation of a component from a mixture, preferably of continuous separation of a homogeneous catalyst from the reaction mixture, in which the membrane area installed can be utilized optimally in different load states, for example for maximization of the yield.

The underlying problem was solved by the method set forth herein. Preferred configurations and embodiments are specified herein.

DETAILED DESCRIPTION

Figure 1:
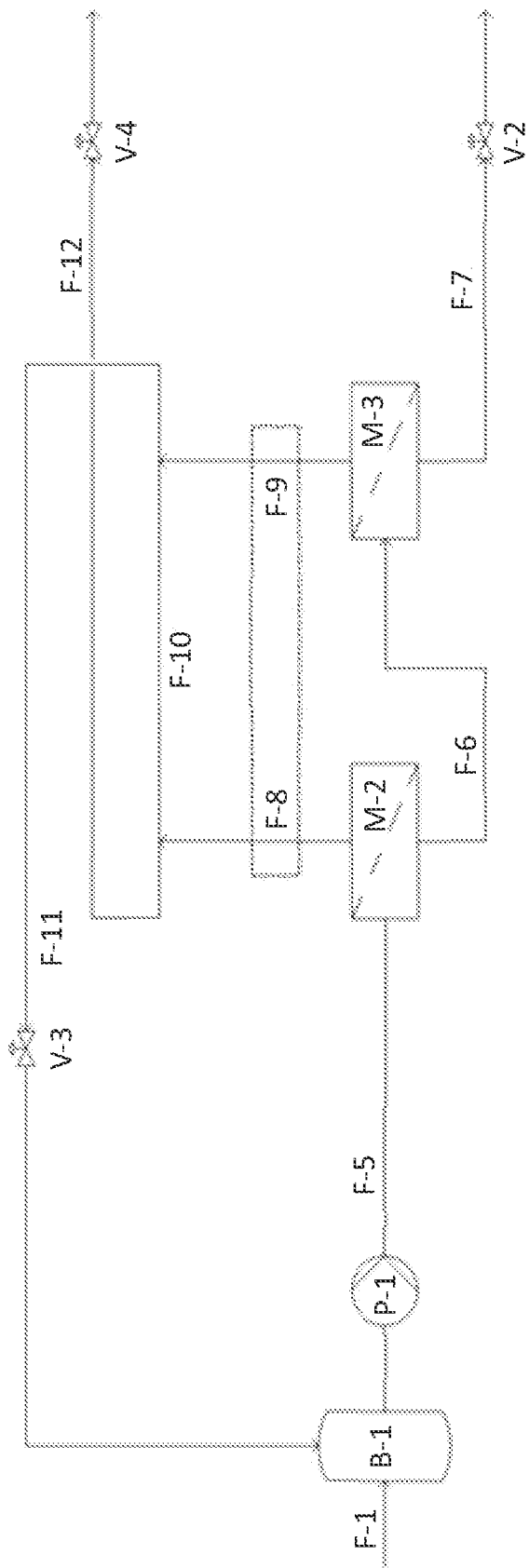
FIG. 1 shows a schematic of a membrane unit comprising a membrane stage with two membrane modules.

The method according to the invention is a method of continuously separating a component from a liquid mixture using a membrane unit which comprises at least one membrane stage and is fed with the mixture as feed, wherein a membrane stage consists at least of a conveying device, at least two series-connected membrane modules, and a feed vessel upstream of the conveying device, wherein the method comprises the following steps in which:
the mixture from the feed vessel is guided by means of the conveying device as feed to the first of the at least two membrane modules, which depletes the component to be separated off, based in each case on the mixture guided to the first membrane module, in the resulting permeate stream from the first membrane module and enriches it in the resulting retentate stream from the first membrane module, the retentate from the first membrane module is guided to the second membrane module, which depletes the component to be separated off, based in each case on the retentate from the first membrane module, in the resulting permeate stream from the second membrane module and enriches it in the resulting retentate stream from the second membrane module, characterized in that the at least two membrane modules are joined to one another on the permeate side by such a means that the at least two permeate streams are each guided to a common pipeline, which gives rise to an overall permeate stream in the pipeline, and the at least two membrane modules are connected to the common pipeline on the permeate side in opposite directions such that the portion of the overall permeate stream, the recycled permeate, is recycled at least partly to the feed vessel and/or beyond the feed vessel but upstream of the conveying device, while the remainder of the overall permeate stream, the removed permeate, is guided at least partly out of the membrane stage, with the recycled permeate having a higher concentration of the component to be separated off than the removed permeate.

In the context of the present invention, what is meant by the term "component to be separated off" is the component intended to permeate through the membrane to a lesser degree in terms of its proportion and/or according to permeability, i.e. the component that is retained by the membrane. The component to be separated off thus has positive retention for the particular membrane modules in question. The component to be separated off may additionally be a single specific chemical substance or else a group of chemical substances that can be considered in a common context for process technology purposes.

The method according to the invention may also comprise more than two membrane modules. If there are three or more membrane modules, it is preferable that the retentate from the previous membrane module is guided to the subsequent membrane module (not applicable to last membrane module), as a result of which a component to be separated off, based in each case on the retentate from the previous membrane module, is depleted in the resulting permeate stream from the subsequent membrane module and is enriched in the resulting retentate stream from the subsequent membrane module.

"Membrane unit" in the context of the present invention relates to the entire membrane separation unit supplied with the liquid mixture containing the component to be separated off. A membrane unit consists of at least one membrane stage. Downstream further processing or purification steps and any storage of the permeate removed in a vessel are therefore not part of the membrane unit by definition.

The term "membrane stage" means at least a portion of the membrane unit and includes at least one conveying device, for example a pump, and at least two membrane modules. If there is just a single membrane stage, the terms "membrane unit" and "membrane stage" should be understood synonymously. The membrane stage has a feed vessel connected upstream of the conveying device, into which the liquid mixture, for example the output from a homogeneously catalyzed reaction, is introduced, and from which it is guided to the one or more membrane elements. The permeate recycled can likewise be guided into the feed vessel. Additionally or alternatively, it is possible that the permeate recycled is guided not into the feed vessel, but rather beyond the feed vessel but upstream of the conveying device, i.e. at a point in the conduit between feed vessel and conveying device.

The term "membrane module" utilized for description of the present invention relates to a subunit, in terms of plant technology, of the membrane stage. A membrane module is accordingly an interconnection of one or more membrane element(s). Membrane modules may be configured either as a membrane loop or as a membrane rack. A membrane loop is understood to mean a subunit in which there is at least one membrane element and at least one conveying device by which a moving overflow circulation is generated. The term "membrane rack", by contrast, means a subunit having the feature that there is at least one membrane element but no conveying device, and accordingly no moving overflow circulation is generated either.

The term "membrane element" in the context of the present invention means the membrane or the structure or the apparatus containing the membrane, and where the desired separation of matter actually takes place, i.e. the component is separated from the mixture or the homogeneous catalyst from the reaction solution. These may be, for example, spiral-wound elements as used in many applications in industrial membrane separation.

The basis of the invention is that only the overall permeate stream from the last membrane stage is divided into the permeate recycled and the permeate removed. Should there be only one membrane stage, this single membrane stage is also the last membrane stage. If there are two or more membrane stages, no division takes place in the first membrane stage(s); instead, the entire permeate stream is guided to the next membrane stage in its entirety. The division is then effected, as described above, exclusively in the last membrane stage. The term "division" in the context of the present invention relates exclusively to the amount or mass flow rate of the overall permeate and means explicitly no additional separation step in which the further components are removed from the overall permeate, i.e., for example, no distillation, no extraction, no crystallization, no adsorption and no further membrane separation steps.

One advantage of the method according to the invention is that a portion of the overall permeate stream from the last membrane stage, i.e. the permeate recycled, does not leave the membrane stage and/or does not leave the membrane unit to only then be recycled via a permeate vessel, for example, but rather remains within the at least one membrane stage and/or the membrane unit and thence is recycled to the feed vessel and/or beyond the feed vessel but upstream of the conveying device. This makes it possible to dispense with a downstream pump that pumps the permeate back into the overflow circuit or back into the feed vessel, since the permeate recycling is self-regulating according to the load. The recycling of the recycled permeate to the feed vessel and/or beyond the feed vessel but upstream of the conveying device is thus effected not by means of a conveying device but rather by hydraulic means, i.e. by means of a pressure differential existing between the permeate side of the membrane unit and the suction side of the conveying device or the feed vessel. In other words, there is no further conveying device, in particular no pump, between the permeate side and the feed vessel.

The portion of the overall permeate stream which is removed from the membrane stage or the membrane unit, i.e. the permeate removed, can be guided to a downstream process step. The term "process step" in the context of the present invention may be understood to mean any downstream process, for example further processing or purification process steps or combinations thereof. This especially includes a (further) reaction of the component removed, purification by known methods such as distillation, evaporation or the like. Downstream dispensing or transport process steps are also possible. Before the downstream process step, prior storage in a suitable vessel is also possible, for example in a permeate vessel. If there is a permeate vessel, the division of the overall permeate according to the invention is effected upstream of the permeate vessel, such that only the permeate removed gets into the permeate vessel. It will be apparent that multiple process steps, optionally via prior storage, may be effected in succession, for example a purification followed by a conversion of the purified component and additional purification of the reaction product.

According to the invention, the at least two membrane modules are connected to a common pipeline on the permeate side in opposite directions such that the portion of the overall permeate that comes at least predominantly from the last membrane module on the retentate side (the recycled permeate) is recycled at least partly to the feed vessel and/or beyond the feed vessel but upstream of the conveying device, while the remainder of the overall permeate that comes at least predominantly from the first membrane module on the retentate side (the removed permeate) is guided at least partly out of the membrane stage. The permeate from all membrane modules present in such a membrane stage is thus guided to a common pipeline and separated therein. In the common pipeline, between the connections of the first and last membrane modules to the pipeline, there are preferably no controlling actuators, for example valves or separating units. However, this does not rule out the presence of non-regulating actuators, i.e. actuators that are present but do not intervene in the process, for example a constantly and completely open valve. What is achieved by the concept of the invention in a simple manner, in terms of plant technology, is that the recycled permeate has a higher concentration of the component to be separated off than the permeate removed. These plant- and control-related functions, in the unfavorable case that there is no feed to the feed vessel from an upstream process step, have the effect that complete recycling of the permeate from all modules to the feed vessel or into the membrane unit takes place.

The present method ensures that the different permeates from the at least two membrane modules do not mix completely, meaning that a mixture having the same concentration of the component to be separated off is formed in the common pipeline. What is ultimately to be achieved is that the recycled permeate has a higher concentration of the component to be separated off than the permeate removed, which would not be achieved in the case of complete mixing. This can also be illustrated by FIG. 1: for instance, in the course of the process of the invention, the result must be that the concentration of the component to be separated off in the recycled permeate is greater than in the permeate removed. Based on the concentration of the component to be separated off, it is accordingly always the case that F-11>F-12. A preferred additional result is that the concentration of the component to be separated off in the recycled permeate is greater than in the common pipeline between the connections of the first and last membrane modules, with the concentration of the component to be separated off being greater therein than in the permeate removed. Based on the concentration of the component to be separated off, it is accordingly the case that F-11>F-10>F-12. The prevention of complete mixing can be achieved in various ways by plant technology. A preferred option according to the present invention is the characteristics of the common pipeline (for example length, diameter, etc.), which are adjusted so as to avoid complete mixing of the overall permeate.

In order to control the exit flow rates of the permeate recycled and the permeate removed, there may be at least one adjustable flow resistor on the permeate side, by means of which the mass flow rate of the permeate is controlled. A flow resistor in the context of the present invention is an actuator with which the mass flow rate of a stream can be controlled, for example a valve. Preference is further given to an embodiment in which there are at least two adjustable flow resistors, preferably exactly two adjustable flow resistors, on the permeate side, which means that the mass flow rate of the permeate removed and the permeate pressure, especially of the common pipeline, can be adjusted. The at least two adjustable flow resistors are especially valves. The valves are preferably present not between the connections of the first and last membrane modules to the pipeline, but are beyond said connections to the pipeline in flow direction of the permeate recycled or removed.

With regard to the membrane separation method according to the invention, there is a stable external mass balance, meaning that the mass flow rate of the feed supply to the membrane unit corresponds to the mass flow rates of the permeate streams and/or retentate streams conducted out of the membrane units. It is possible to make use of this circumstance. In a preferred embodiment of the present invention, the mass flow rate of one of the three streams selected from feed to the membrane unit, the permeate removed, and the retentate from the membrane unit is defined by a preceding or downstream process step, and one further stream of the three is controlled toward a target value, for example a constant retentate flow rate, a constant ratio of feed to retentate, etc. On account of the external mass balance, this also results in the third of the three streams mentioned. The scale and hence the absolute mass flow rates are adjustable largely as desired with reference to the membrane module size and number of membrane modules. In a preferred embodiment, the ratio of the retentate mass flow rate to the mass flow rate is 1% to 99%, preferably 10% to 90% and more preferably 15% to 80%. In a further preferred embodiment, the ratio of the mass flow rate of the permeate removed to the overall permeate mass flow rate is 1% to 99%, preferably 30% to 98%, more preferably 60% to 97%. "Process step" in the context of the present invention is a plant or process unit, for example an upstream or downstream chemical reaction in which the permeate/retentate is used, a further separation step, for example a thermal separation such as thin-film evaporation or distillation, or logistics, i.e. especially an upstream or downstream tank farm or a dispensing operation. Upstream process steps are especially continuously performed process steps by means of which a liquid mixture is provided continuously for the present membrane separation process. These are preferably continuous performed chemical reactions, for example hydroformylation or alkoxycarbonylation, which are elucidated in detail hereinafter.

In addition, more particularly, there is also a stable internal mass balance (mass flow rate of the overall permeate, i.e. the sum total of all permeate streams from the membrane modules, corresponding to the sum total of the mass flow rates of the permeate recycled and the permeate removed). According to the present invention, the internal mass balance is preferably largely independent of the external mass balance, meaning that the outer mass balance is in principle merely the lower limit for the internal mass balance. It is therefore preferable in accordance with the invention that the mass flow rate of the permeate recycled can fluctuate and is established depending, preferably directly depending, i.e. without any permeate vessel in between, on the mass flow rate of the permeate removed. This also means that the mass flow rate of the overall permeate, disregarding technical limitations (resulting from pumps, flow resistors, membrane area, etc.), can be controlled independently of the abovementioned external mass balance, provided that the mass flow rate of the overall permeate is greater than the mass flow rate of the permeate removed.

The mass flow rate of the overall permeate depends here on various parameters, for example the temperature (of the membrane modules) or of the concentration of the components in the mixture. In a preferred embodiment of the present invention, therefore, the pressure on the retentate side and/or the pressure on the permeate side or the resulting transmembrane pressure (TMP=pressure differential between permeate side and retentate side) and optionally the membrane module temperature are controlled in order to optimize the amount of the overall permeate stream or to obtain a desired amount of the overall permeate stream.

The membrane separation method according to the invention can be adjusted in various ways in terms of control technology, depending on the respective controlled variable, an actuator present for influencing the controlled variable, and control priority. There are various controlled variables for the present method, such as the fill level of the feed vessel, the pressure on the retentate side and on the permeate side, the differential of which results in the transmembrane pressure (TMP), and the mass flow rates of retentate and permeate that can be influenced by various actuators, for example the conveying device or one or more adjustable flow resistors.

The membrane separation method according to the invention, in a preferred embodiment, is adjusted in terms of control technology in such a way that the mass flow rate of the retentate and the TMP are kept constant. These two parameters consequently have the highest control priorities, where the exact sequence of the control priorities can be fixed as desired, i.e. the mass flow rate of the retentate may have the highest control priority and the TMP the second highest control priority, or vice versa.

The mass flow rate of the feed to the (first) membrane module in the method according to the invention may be established in a manner known to the person skilled in the art, for example via the conveying device used for the (first) membrane stage. The exact embodiment for establishment of the mass flow rate of the feed to the (first) membrane stage is variable and usually depends on technical constraints, for example the type of pump chosen, the conveying rate and the conveying pressure. It would be possible to implement control of the feed mass flow rate, for example, with a pump controlled directly by means of speed, for example a gear pump, a piston pump, a piston membrane pump or optionally a multistage centrifugal pump. Another option for control of the mass flow rate may be that of using a centrifugal pump and an adjustable flow resistor, such as a (control) valve. A further option would be the use of a pump, for example a gear pump, a piston pump, a piston membrane pump or a centrifugal pump, in combination with an adjustable return flow conduit, for example from the pressure site to the suction side of the pump.

The pressure on the retentate side (retentate pressure) can be controlled by means of the conveying device and/or optionally a further actuator, for example a supply pressure regulator. The retentate pressure in the method according to the invention may be 1 to 100 bar, preferably 10 to 80 bar and more preferably 30 to 60 bar. The retentate pressure is greater than the pressure on the permeate side (permeate pressure). The transmembrane pressure formed by the differential of retentate pressure and permeate pressure may be 1 to 90 bar, preferably 10 to 80 and more preferably 30 to 60 bar.

The permeate pressure may then be 0 to 50 bar, preferably 0 to 10 bar and more preferably 1 to 5 bar. The permeate pressure of all membrane modules present, in a preferred embodiment, is similar (with not more than 10% mutual variance) or the same, which can further preferably be established via a supply pressure regulator on the permeate side. This is because the pressures of the individual membrane modules are preferably not controlled independently of the total pressure on the permeate side, for example the common pipeline.

The membrane unit, or the individual membrane stages, preferably comprise(s) a closed-loop control system for the pressure on the retentate side, comprising at least the conveying device and a manometer, where the retentate pressure can be adjusted depending on the manometer. The retentate pressure here may be controlled by adjusting, for example, the conveying volume of the conveying device and optionally by means of a further actuator, for example a supply pressure regulator, depending on the retentate pressure measured (by the manometer), wherein—based on a target value fixed beforehand for the retentate pressure—the conveying volume of the conveying device is reduced when the retentate pressure is elevated and/or rising and the conveying volume of the conveying device is increased when the retentate pressure is reduced and/or falling.

The retentate pressure may alternatively be controlled via a combination of a manometer and an adjustable flow resistor, especially a valve on the retentate side. The retentate pressure can be controlled here, for example, via the valve setting, depending on the retentate pressure measured (by the manometer), wherein—based on a target value fixed beforehand for the retentate pressure—the valve is opened further when the retentate pressure is elevated and/or rising and closed further when the retentate pressure is reduced and/or falling.

The mass flow rate of the retentate (retentate mass flow rate) in the method according to the invention is preferably controlled by means of a mass flow regulator on the retentate side, comprising at least one mass flow meter and an adjustable flow resistor, preferably a valve. The retentate mass flow rate can be controlled here by adjusting the mass flow regulator depending on the retentate mass flow rate measured, wherein—based on a target value fixed beforehand for the retentate mass flow rate—the valve of the mass flow regulator is closed further when the retentate mass flow rate is elevated and/or rising and the valve of the mass flow regulator is opened further when the retentate mass flow rate is reduced and/or falling. The retentate pressure can then be chosen freely within the scope of the minimum necessary and maximum possible loading of the membrane stage(s).

In another embodiment, it is alternatively possible that the retentate mass flow rate is controlled by means of a combination of mass flow meter and the conveying device. The retentate mass flow rate can be controlled here, for example, by adjusting the conveying volume of the conveying device depending on the retentate mass flow rate measured, wherein—based on a target value fixed beforehand for the retentate mass flow rate—the conveying volume of the conveying device is reduced when the retentate mass flow rate is elevated and/or rising and the conveying volume of the conveying device is increased when the retentate mass flow rate is reduced and/or falling.

The sensors and actuators for the closed-loop control of mass flow rate on the retentate side, comprising at least the conveying device or an adjustable flow resistor and a mass flow meter, and the aforementioned closed-loop control of pressure on the retentate side, comprising at least the conveying device or an adjustable flow resistor and a manometer, may be connected to one another in any desired manner for control technology purposes, in order to control the two controlled variables of retentate mass flow rate and retentate pressure. The mutual priority of the two controlled variables of retentate mass flow rate and retentate pressure can be chosen as desired in the method according to the invention. The priority of the two controlled variables of retentate mass flow rate and retentate pressure (and hence the TMP) is preferably higher than that of all other controlled variables in the membrane separation stage, i.e. has the fastest response characteristics.

The mass flow rate of the permeate removed (from the last membrane stage), depending directly or indirectly on the fill level of the feed vessel, is subject to preferably continuous closed-loop control, a feature of which is that—based on a target value fixed beforehand for the fill level of the feed vessel, where the target value is preferably 20% to 80%, more preferably 30% to 70%, of the maximum possible fill level—the mass flow rate of the permeate removed increases with rising fill level of the feed vessel and the mass flow rate of the permeate removed decreases with falling fill level of the feed vessel. In this type of closed-loop control, the feed vessel is not completely filled since the fill level is otherwise at or above the upper edge of its measurement range and hence is unknown, as a result of which no closed-loop control to a target value is possible. The mass flow rate of the permeate removed is especially adjusted via at least one adjustable flow resistor. In the case of continuous closed-loop control, this preferably keeps the fill level of the feed vessel constant. The effect of the closed-loop control principle according to the fill level of the feed vessel would be, for example, that, on attainment of a low level in the feed vessel, the mass flow rate of the permeate removed is reduced ever further and possibly no further permeate is removed.

The temperature of the three streams of feed, retentate and permeate may vary within a wide range. The temperature of each of the three streams of feed, retentate and permeate is independently preferably −30° C. to 150° C., more preferably 0° C. to 100° C. and most preferably 20° C. to 80° C.

A contribution to the achievement of the aforementioned modes of execution of the method according to the invention in terms of control technology is also made by the construction of the membrane unit, which is to be described in more detail hereinafter.

The membrane unit which is used in the method according to the invention for separating the component from the mixture comprises at least one membrane stage. The membrane unit may alternatively comprise multiple membrane stages connected in series to one another. In this case, the overall permeate stream is divided only in the last membrane stage.

A membrane stage of the membrane unit for the method according to the invention, according to the above definition, comprises a conveying device. The conveying device with which the mixture is guided as feed to the at least two series-connected membrane modules is preferably adjustable with regard to its conveying volume. The pressure of the feed to the at least two membrane modules may be 1 to 100 bar, preferably 10 to 80 bar and more preferably 30 to 60 bar. Suitable conveying devices are, for example, pumps known to the person skilled in the art, such as centrifugal pumps, piston pumps, piston membrane pumps, rotary piston pumps or gear pumps.

A membrane stage of the membrane unit according to the invention further comprises at least two series-connected membrane modules. There is theoretically no upper limit to the number of membrane modules; instead, it depends on the general process parameters and the desired membrane area. In a preferred embodiment, the membrane stage comprises more than two membrane modules that are further preferably connected in series to one another. The mixture arriving at the membrane unit is guided to the (first) membrane stage, where it is guided to the one or more membrane modules by means of the conveying device as feed. The separation into permeate and retentate is effected within the membrane stage, with a permeate stream being withdrawn from each membrane module present.

In the at least two membrane modules present here, accordingly, a number of permeate streams corresponding to the number of membrane modules is generated. The membrane modules are connected here to the common pipeline on the permeate side in opposite directions as mentioned above. By contrast, only one retentate stream is obtained, since the retentate from the first membrane module is guided to the next membrane module, a further permeate is separated from the retentate, and the retentate from the second membrane module is then guided to the next membrane module or, if there are only two membrane modules, it is conducted out of the membrane stage and/or the membrane unit.

A membrane stage in the method according to the invention comprises a vessel upstream of the conveying device, from which the feed is guided to the at least two membrane modules as feed by means of the conveying device. If there is just one membrane stage, it is possible for both the feed to the membrane stage and the recycled permeate from the membrane stage to be introduced into the feed vessel and collected therein before they are guided by means of the membrane device as feed to the at least two membrane modules. If there is more than one membrane stage, the feed to the first membrane stage and a retentate from one of the subsequent stages can be collected in the feed vessel for the first stage, while the permeate from the respective preceding membrane stage and either the retentate from the subsequent stage or, in the last membrane stage, recycled permeate can be collected in the feed vessels for the subsequent stage(s). The construction and specifications of such a feed vessel are known to the person skilled in the art.

The feed vessel preferably comprises a measurement unit for the fill level. It is also possible in those variants that the respective recycled streams are guided not into the feed vessel but rather beyond the feed vessel but upstream of the conveying device.

The membrane stage may further comprise sensors and/or actuators in order to be able to fulfil the aforementioned, preferred control-related functions. These especially include measurement and/or control units for the parameters such as temperature, pressure, mass flow rate or the like. Corresponding measurement and control units are known to the person skilled in the art.

A membrane module according to the present invention, of which there are at least two in the membrane stage, comprises one or more membrane element(s). In principle, membrane modules may, as mentioned, be configured either as a membrane loop or as a membrane rack. The membrane modules present in accordance with the invention in the membrane stage(s) are preferably membrane loops.

A membrane loop comprises one or more membrane element(s) and at least one conveying device. A membrane loop preferably comprises just one conveying device. This conveying device is not identical to the conveying device for the corresponding membrane stage; instead, in that case, the entire system has at least two conveying devices. The conveying device of the membrane loop is generally responsible for the circulation of the membrane loop, while the conveying device of the membrane stage is generally responsible for the pressurization of the membrane modules or of the membrane loop. The conveying device used may be any suitable pump. Such pumps are known to the person skilled in the art. The pump used as conveying device within a membrane loop is preferably a centrifugal pump. The conveying device generates a moving overflow circulation. The overflow circulation can ideally improve mass transfer and hence the separation performance of the membrane. The overflow circulation can be adjusted here independently of the overriding control concept and the external and internal mass balance.

A membrane loop may additionally also comprise measurement and/or control units for parameters such as temperature, pressure differential (axial pressure drop), circulation rate or the like, for example a heater or cooler in order to adjust the temperature. Further measurement and control units are known to the person skilled in the art. In a preferred embodiment, the pressure in all membrane loops present in a membrane stage is similar (variance<10%) or identical. This at least similar pressure can be established without the presence of a particular control unit, but may also be established by means of a pressure regulator. The pressure regulator for the permeate pressure preferably has the slowest response characteristics compared to the other actuators, i.e. the closed-loop control of mass flow on the permeate side, the closed-loop control of mass flow on the retentate side and the closed-loop control of pressure on the retentate side.

By contrast with the above-described membrane loop, a membrane module configured as a membrane rack does not have a conveying device, but rather one or more membrane elements and optionally additional measurement and control units.

The membrane element(s) present in the membrane module, preferably in the membrane loop, are elements prefabricated for industrial use that contain the membrane and can be considered as a base unit that cannot be divided any further in the membrane separation method according to the invention. The membrane element(s) may be used as such in the membrane module or be disposed in a pressure housing, for example a pressure tube. The pressure tube considered in isolation may contain one or more membrane element(s), preferably up to five membrane elements. If the membrane element(s) are disposed in a pressure housing, preferably a pressure tube, a membrane module may comprise multiple pressure tubes. The flow preferably passes in series on the feed or retentate side through the membrane elements disposed in a pressure tube, and they are preferably connected on the permeate side. Base units used as membrane element may be spiral-wound elements known to the person skilled in the art. One or more spiral-wound elements may then be present in a pressure housing, preferably a pressure tube.

Membranes used are preferably those having a separation-active layer made of a material selected from the group consisting of cellulose acetate, cellulose triacetate, cellulose nitrate, regenerated cellulose, polyimides, polyamides, polyetheretherketones, sulfonated polyetheretherketones, aromatic polyamides, polyamidoimides, polybenzimidazoles, polybenzimidazolones, polyacrylonitrile, polyarylethersulfones, polyesters, polycarbonates, polytetrafluorethylene, polyvinylidene fluoride, polypropylene, terminally or laterally organomodified siloxane, polydimethylsiloxane, silicones, silicone acrylates, polyphosphazenes, polyphenylsulfides, polybenzimidazoles, Nylon® (nylon-6,6), polysulfones, polyanilines, polypropylenes, polyurethanes, acrylonitrile/glycidyl methacrylate (PANGMA), polytrimethylsilylpropynes, polymethylpentynes, polyvinyltrimethylsilane, polyphenylene oxide, alpha-aluminium oxides, gamma-aluminium oxides, titanium oxides, silicon oxides, zirconium oxides, ceramic membranes hydrophobized with silanes, as described in EP 1 603 663 B1, polymers with intrinsic microporosity (PIM) such as PIM-1 and others, as described, for example, in EP 0 781 166 B1, or mixtures thereof. The abovementioned substances may be in crosslinked form in the separation-active layer through addition of auxiliaries, or in the form of what are called mixed matrix membranes with fillers, for example carbon nanotubes, metal-organic frameworks or hollow spheres, and particles of inorganic oxides or inorganic fibers, for example ceramic fibers or glass fibers.

Particular preference is given to using membranes having, as a separation-active layer, a polymer layer of terminally or laterally organomodified siloxane, polydimethylsiloxane, silicone acrylates or polyimide, formed from polymers having intrinsic microporosity (PIM) such as PIM-1, or wherein the separation-active layer has been formed by means of a hydrophobized ceramic membrane. Very particular preference is given to using membranes formed from terminally or laterally organomodified siloxanes or polydimethylsiloxanes. Membranes of this kind are commercially available.

As well as the abovementioned materials, the membranes may include further materials. More particularly, the membranes may include support or carrier materials to which the separation-active layer has been applied. A selection of support materials is described by EP 0 781 166, to which reference is made explicitly.

In a particularly preferred embodiment, the method described is utilized for membrane separation of a homogeneous catalyst. The component to be separated off is then the homogeneous catalyst, and the liquid mixture is the reaction mixture obtained from a reaction stage.

A particularly preferred method according to the present invention is therefore a method of continuously separating a homogeneous catalyst from a liquid reaction mixture using a membrane unit which comprises at least one membrane stage and is fed with the reaction mixture containing the homogeneous catalyst and coming from a reaction zone as feed, wherein a membrane stage consists at least of a conveying device, at least two series-connected membrane modules, and a feed vessel upstream of the conveying device, wherein the method comprises the following steps in which:

the reaction mixture from the feed vessel is guided by means of the conveying device as feed to the first of the at least two membrane modules, which depletes the homogeneous catalyst, based in each case on the mixture guided to the first membrane module, in the resulting permeate stream from the first membrane module and enriches it in the resulting retentate stream from the first membrane module, the retentate stream from the first membrane module is guided to the second membrane module, which depletes the homogeneous catalyst, based in each case on the retentate from the first membrane module, in the resulting permeate stream from the second membrane module and enriches it in the resulting retentate stream from the second membrane module, characterized in that the at least two membrane modules are joined sequentially to one another on the permeate side in such a way that the at least two permeate streams form an overall permeate stream in which complete mixing of the individual permeate streams does not take place, and a portion of the overall permeate stream, the recycled permeate, is recycled to the feed vessel and/or beyond the feed vessel but upstream of the conveying device, and the remainder of the overall permeate stream, the removed permeate, is removed from the membrane stage, with the recycled permeate having a higher concentration of the homogeneous catalyst than the removed permeate.

The reaction mixture comes from a reaction zone suitable for the respective method, preferably one or more suitable reactors. The retentate stream containing at least a majority of the homogeneous catalyst is preferably recycled to the reaction zone, especially the reactor(s), optionally after prior purification and/or workup of the catalyst. Since the mass flow rate from the reaction zone can vary for production-related reasons, the above-described control- and plant-related functions can also be employed in the separating-off of homogeneous catalysts.

In the reaction zone, preferably the reactor(s), a homogeneously catalyzed reaction is accordingly conducted. These reactions may be the following: oxidations, epoxidations, hydroformylations, hydroaminations, hydroaminomethylations, hydrocyanations, hydrocarboxylations, hydrocarbonylations, hydrocarboxyalkylations, alkoxycarbonylations, aminations, ammoxidation, oximations, hydrosilylations, ethoxylations, propoxylations, carbonylations, telomerizations, metatheses, Suzuki couplings and hydrogenations.

Preference is given to a hydroformylation. The hydroformylation is especially a hydroformylation of olefins having 3 to 15 carbon atoms, preferably 8 to 12 carbon atoms. The hydroformylation is preferably a homogeneously catalyzed hydroformylation in which the catalyst system is (fully) dissolved in the liquid phase of the reaction mixture. The catalyst system for the hydroformylation preferably comprises a transition metal from group 8 or 9 of the Periodic Table of the Elements (PTE) and at least one organic phosphorus-containing ligand. Suitable phosphorus-containing ligands are known to the person skilled in the art, but are preferably monodentate phosphorus-containing ligands, for example tris(2,4-di-tert-butylphenyl)phosphite.

Transition metals used may especially be iron, ruthenium, iridium, cobalt or rhodium, preferably cobalt or rhodium, more preferably rhodium. Catalytically active species discussed are typically (ligand)-carbonyl complexes of the metal atoms that form in the liquid reaction mixture under elevated pressure and elevated temperature.

The hydroformylation may be conducted in the presence of a solvent, in which case the solvent should be compatible with the hydroformylation method. Solvents used may be suitable solvents known to the person skilled in the art for hydroformylation, for example alkanes, aromatic hydrocarbons, water, ethers, esters, ketones, alcohols and the reaction products or by-products of the hydroformylation, such as aldehydes and condensation products of the aldehydes.

In addition, the hydroformylation can be conducted at a pressure of 10 to 400 bar, preferably 15 to 270 bar. The temperature in the hydroformylation may be 70 to 250° C., preferably 100 to 200° C., more preferably 120 to 160° C.

The present invention is described by the figures which follow, in which particular embodiments are shown. The figures constitute merely an illustration and should not be regarded as limiting.

FIG. 1 shows an illustrative construction of a membrane unit comprising a membrane stage with two membrane modules. The membrane stage consists of a feed vessel (B-1), a pump (P-1) and two membrane modules (M-2/M-3). The feed vessel (B-1) is fed with the liquid mixture as feed to the membrane stage (F-1). From the feed vessel (B-1), the liquid mixture is guided by the pump (P-1) as feed (F-5) to the first membrane module (M-2), for example a membrane loop, where the first membrane separation in this case takes place. From the membrane module (M-2), the retentate from the first membrane module (F-6) and the permeate from the first membrane module (F-8) are then withdrawn. The retentate (F-6) is guided to the second membrane module (M-3), where a further membrane separation takes place, which gives rise to the permeate (F-9) and the retentate (F-7) from the second or last membrane module (M-3). The retentate (F-7) is withdrawn via the discharge valve (V-2). The two permeates (F-8/F-9) from the two membrane modules (M-2/M-3) are guided to a common pipeline (F-10). The two permeates (F-8/F-9), in the context of the present invention, give rise to the overall permeate (dotted rectangle), which exists at least as calculation variable even without complete mixing. Two permeate streams are withdrawn from the common pipeline (F-10): the permeate recycled (F-11) and the permeate removed (F-12). The permeate removed (F-12) is removed via the discharge valve (V-4), and the recycled permeate (F-11) via the return valve (V-3) to the feed vessel (B-1). It would also be conceivable that the permeate recycled (F-11) is fed not into the feed vessel (B-1) but between feed vessel (B-1) and pump (P-2) (not shown).

Figure 2:
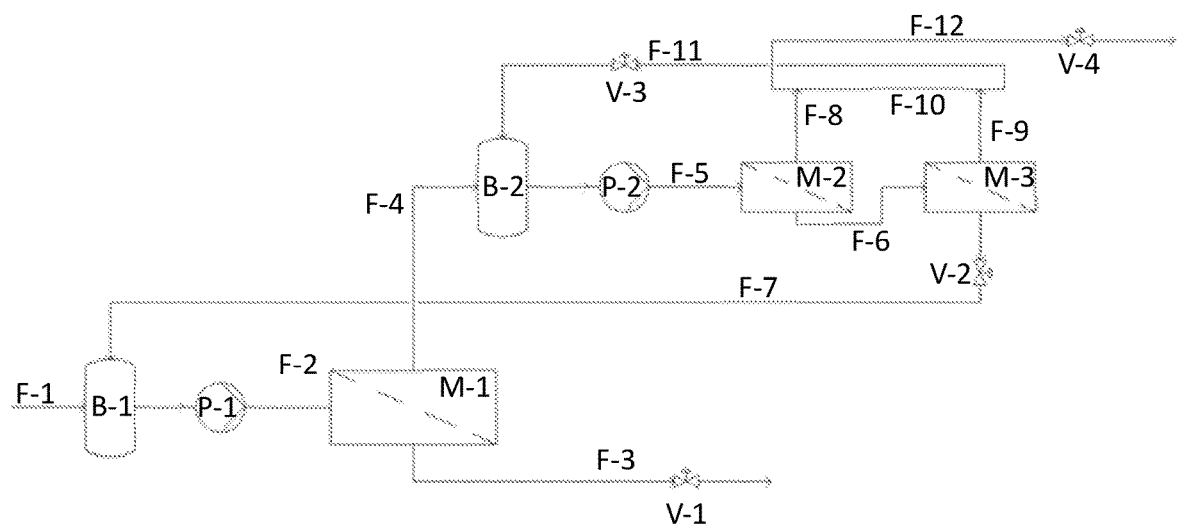
FIG. 2 shows a schematic of a membrane unit comprising two membrane stages.

FIG. 2 shows an exemplary construction of a membrane unit comprising two membrane stages. The membrane stages each consist of a feed vessel (B-1/B-2), a pump in each case (P-1/P-2) and one or two membrane modules (M-1/M-2/M-3). The feed vessel (B-1) is fed with the liquid mixture as feed to the membrane stage (F-1). From the feed vessel (B-1), the liquid mixture is guided by the pump (P-1) as feed (F-2) to the membrane module (M-1), for example a membrane loop, where the membrane separation takes place. From the membrane module (M-1), the permeate (F-4) from the first membrane stage and the retentate (F-3) are withdrawn via the discharge valve (V-1). The permeate (F-4) from the first membrane module (M-1) is guided to the feed vessel (B-2) for the second membrane stage and thence guided by means of a pump (P-2) as feed (F-5) to the first membrane module (M-2) of the second membrane stage, for example a membrane loop, where a membrane separation takes place. From the membrane module (M-2), the retentate from the first membrane module (F-6) and the permeate from the first membrane module (F-8) are then withdrawn. The retentate (F-6) is guided to the second or last membrane module (M-3) of the second membrane stage, where a further membrane separation takes place, which gives rise to the permeate (F-9) and the retentate (F-7) from the second membrane module (M-3). The retentate (F-7) is subsequently guided via the discharge valve (V-2) to the feed vessel (B-1) of the first membrane stage. The two permeates (F-8/F-9) from the two membrane modules (M-2/M-3) are guided to a common pipeline (F-10). Two permeate streams are withdrawn from the common pipeline: the permeate recycled (F-11) and the permeate removed (F-12). The permeate removed (F-12) is removed via the discharge valve (V-4), and the recycled permeate (F-11) via the return valve (V-3) to the feed vessel (B-1). It would also be conceivable that the permeate recycled (F-11) is fed not into the feed vessel (B-1) but between feed vessel (B-1) and pump (P-2) (not shown).

The invention claimed is:

1. A method of continuously separating a component from a liquid mixture using a membrane unit which comprises at least one membrane stage and is fed with the mixture as feed, wherein a membrane stage comprises at least a conveying device, at least two series-connected membrane modules, and a feed vessel upstream of the conveying device,
   wherein the method comprises the following steps in which:
   the mixture is guided from the feed vessel by means of the conveying device as feed to a first membrane module of the at least two membrane modules, which depletes the component to be separated off, based on the mixture guided to the first membrane module, in a resulting permeate stream from the first membrane module and enriches it in a resulting retentate stream from the first membrane module,
   the retentate from the first membrane module is guided to a second membrane module, which depletes the component to be separated off, based on the retentate from the first membrane module, in a resulting permeate stream from the second membrane module and enriches it in a resulting retentate stream from the second membrane module,
   wherein
   the at least two membrane modules are joined to one another on the permeate side by such means that the permeate stream from the first membrane module and the permeate stream from the second membrane module are each guided to a common pipeline, which gives rise to an overall permeate stream in the common pipeline, and
   wherein the at least two membrane modules are connected to the common pipeline on the permeate side in opposite directions such that a portion of the overall permeate stream, a recycled permeate, is recycled at least partly to the feed vessel and/or beyond the feed vessel but upstream of the conveying device, while the remainder of the overall permeate stream, a removed permeate, is at least partly guided out of the membrane stage, with the recycled permeate having a higher concentration of the component to be separated off than the removed permeate.

2. The method according to claim 1, wherein the concentration of the component to be separated off in the recycled permeate is greater than in the common pipeline between the connections of the first and last membrane modules, and wherein the concentration of the component to be separated off in the common pipeline is greater than in the removed permeate.

3. The method according to claim 1, wherein there are no controlling actuators in the common pipeline between the connections of the first and last membrane modules to the common pipeline.

4. The method according to claim 1, wherein the recycling of the recycled permeate to the feed vessel and/or beyond the feed vessel but upstream of the conveying device is not carried out by means of a conveying device but by a pressure differential existing between a permeate side of the membrane unit and a suction side of the conveying device or the feed vessel.

5. The method according to claim 1, wherein a mass flow rate of one stream of the three streams selected from the feed to the membrane unit, the removed permeate, and the retentate from the membrane unit is defined by a preceding or downstream process step, and one further stream of the three streams is controlled toward a target value.

6. The method according to claim 1, wherein a mass flow rate of the recycled permeate can fluctuate and is established depending on a mass flow rate of the removed permeate.

7. The method according to claim 1, wherein both a mass flow rate of the removed permeate and a permeate pressure are established in each case by means of an adjustable flow resistor.

8. The method according to claim 1, wherein a mass flow rate of the removed permeate, depending directly or indirectly on a fill level of the feed vessel, is subject to continuous closed-loop control, a feature of which is that—based on a target value fixed beforehand for the fill level of the feed vessel—the mass flow rate of the removed permeate increases with rising fill level of the feed vessel and the mass flow rate of the removed permeate decreases with falling fill level of the feed vessel.

9. The method according to claim 1, wherein the pressure on the retentate side (retentate pressure) is controlled by means of the conveying device with which the feed is fed to one or more membrane modules, and optionally a further actuator, or by means of a combination of a manometer and an adjustable flow resistor.

10. The method according to claim 1, wherein a mass flow rate on the retentate side (retentate mass flow rate) is controlled by means of a closed-loop mass flow control system on the retentate side, comprising at least a mass flow meter and an adjustable flow resistor, or by means of a combination of mass flow meter and the conveying device.

11. The method according to claim 1, wherein the component is a homogeneous catalyst which is separated from a reaction mixture.

12. The method according to claim 1, wherein the conveying device is a pump.

13. A method of continuously separating a homogeneous catalyst from a liquid reaction mixture using a membrane unit which comprises at least one membrane stage and is fed with the liquid reaction mixture containing the homogeneous catalyst and coming from a reaction zone as feed, wherein a membrane stage comprises at least a conveying device, at least two series-connected membrane modules, and a feed vessel upstream of the conveying device,
   wherein the method comprises the following steps in which:
   the liquid reaction mixture is guided from the feed vessel by means of the conveying device as feed to a first membrane module of the at least two membrane modules, which depletes the homogeneous catalyst, based on the liquid reaction mixture guided to the first membrane module, in a resulting permeate stream from the first membrane module and enriches it in a resulting retentate stream from the first membrane module, the retentate from the first membrane module is guided to a second membrane module, which depletes the homogeneous catalyst, based on the retentate from the first membrane module, in a resulting permeate stream from the second membrane module and enriches it in a resulting retentate stream from the second membrane module, wherein the at least two membrane modules are joined sequentially to one another on the permeate side in such a way that the permeate stream from the first membrane module and the permeate stream from the second membrane module form an overall permeate stream in which complete mixing of individual permeate streams does not take place, and a portion of the overall permeate stream, a recycled permeate, is recycled to the feed vessel and/or beyond the feed vessel but upstream of the conveying device, and the remainder of the overall permeate stream, a removed permeate, is removed from the membrane stage, with the recycled permeate having a higher concentration of the homogeneous catalyst than the removed permeate.

14. The method according to claim 13, wherein the liquid reaction mixture is taken from the reaction zone in which a homogeneously catalyzed reaction is being conducted.

15. The method according to claim 14, wherein the homogeneously catalyzed reaction is selected from the group of the following reactions: oxidations, epoxidations, hydroformylations, hydroaminations, hydroaminomethylations, hydrocyanations, hydrocarboxylations, hydrocarbonylations, hydrocarboxyalkylations, alkoxycarbonylations, aminations, ammoxidation, oximations, hydrosilylations, ethoxylations, propoxylations, carbonylations, telomerizations, metatheses, Suzuki couplings and hydrogenations.

16. The method according to claim 2, wherein there are no controlling actuators in the common pipeline between the connections of the first and last membrane modules to the common pipeline.

17. The method according to claim 2, wherein the recycling of the recycled permeate to the feed vessel and/or beyond the feed vessel but upstream of the conveying device is not carried out by means of a conveying device but by a pressure differential existing between a permeate side of the membrane unit and a suction side of the conveying device or the feed vessel.

18. The method according to claim 2, wherein a mass flow rate of one stream of the three streams selected from the feed to the membrane unit, the removed permeate, and the retentate from the membrane unit is defined by a preceding or downstream process step, and one further stream of the three streams is controlled toward a target value.

19. The method according to claim 2, wherein a mass flow rate of the recycled permeate can fluctuate and is established depending on a mass flow rate of the removed permeate.

20. The method according to claim 2, wherein both a mass flow rate of the removed permeate and the permeate pressure are established in each case by means of an adjustable flow resistor.

* * * * *